UNITED STATES PATENT OFFICE.

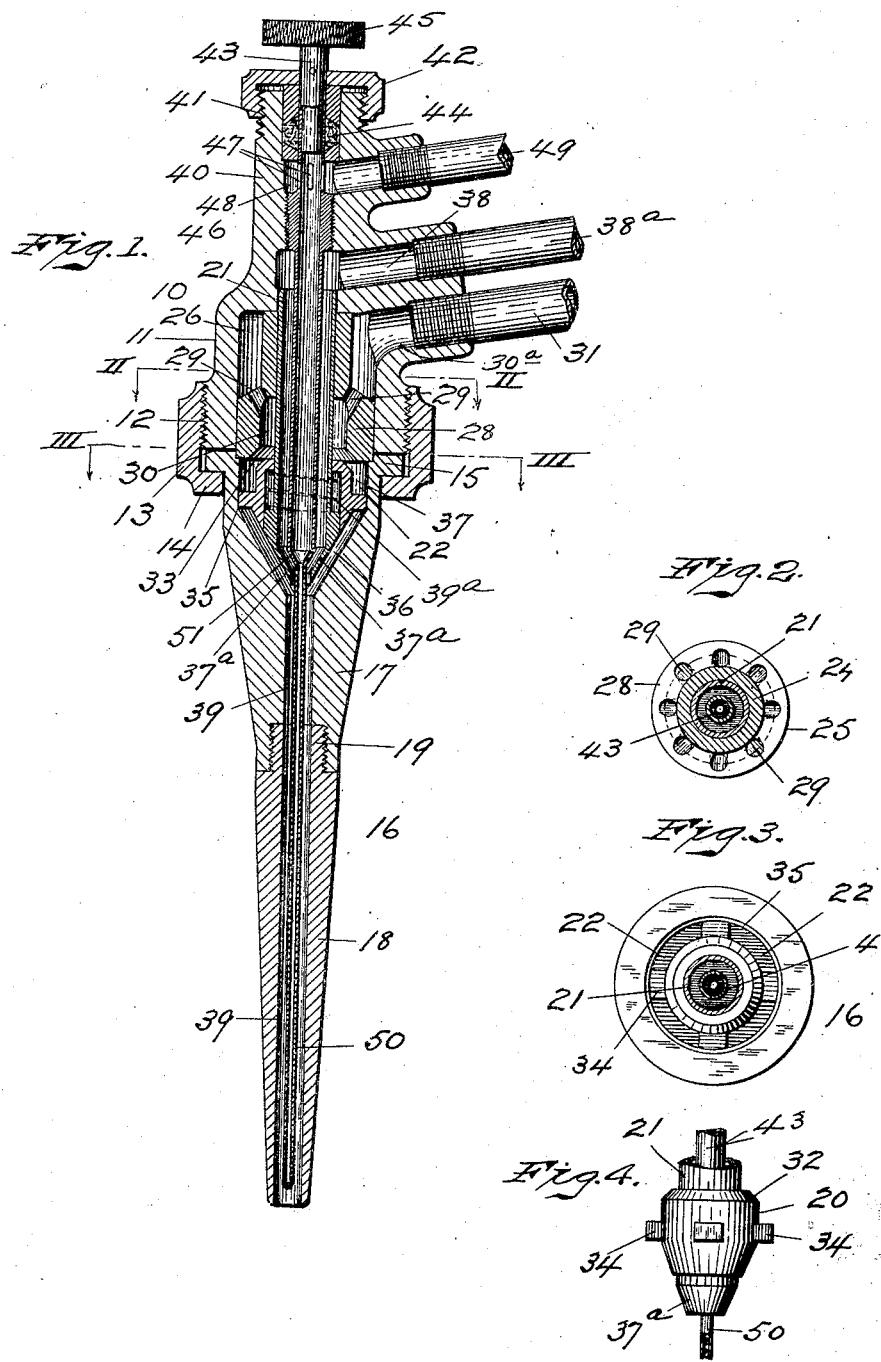

HARRY BROUSSEAU, OF NEW YORK, N. Y., ASSIGNOR, BY DIRECT AND MESNE ASSIGNMENTS, TO THE STANDARD WELDING & EQUIPMENT CORPORATION, OF NEW YORK, N. Y., A CORPORATION OF NEW YORK.

TORCH.

1,088,204.   Specification of Letters Patent.   Patented Feb. 24, 1914.

Application filed January 5, 1912. Serial No. 669,578.

*To all whom it may concern:*

Be it known that I, HARRY BROUSSEAU, a citizen of the United States, and a resident of New York, borough of Brooklyn, county of Kings, and State of New York, have invented certain new and useful Improvements in Torches, of which the following is a full, clear, and exact description.

This invention relates more particularly to a torch adapted for cutting and welding metal.

The primary object of the invention is to provide simple means whereby the gaseous supply for cutting purposes may be caused to pass centrally through the torch and the said means so constructed that it may be adjusted and made to coöperate with the means communicating with the source of supply for the welding gases, so that the supply of the said latter gases or a part of them may have its supply regulated during such adjustment thereby quickly converting the torch from a device for welding purposes to one for cutting or vice versa.

Another object of the invention is to provide a simple and efficient torch or like article in which a valve or similar device may be utilized to automatically shut off the acetylene gas or fuel supply in case of a back flash and thereby prevent the ignition of the gases within the torch as often occurs and which results in loss of gas and time due to the necessity for resetting the valves controlling the gas supply.

Other objects of the invention are to provide a device in which a plurality of nozzles may be interchangeably used in connection with the head; to provide a nozzle which may be rotatably held on the head or immovably fixed thereto; and to provide a device which is simple in construction and which may be readily made and assembled.

A further object of the invention is to provide a valve which may be supported in a part of the device so as to be freely movable therein and which coöperates with a part of its support to assist in mixing the acetylene gas or fuel supply with the oxygen gas.

With these and other objects in view, the invention will be hereinafter more particularly described with reference to the accompanying drawings, which form a part of this specification, and will then be pointed out in the claims at the end of the description.

In the drawings, Figure 1 is a sectional view, partly in elevation, of one form of torch embodying my invention. Fig. 2 is a sectional plan taken on the line II—II of Fig. 1, the head being removed. Fig. 3 is a sectional plan taken on the line III—III of Fig. 1, the coupling nut being removed; and Fig. 4 is a fragmentary detail elevation of the valve and supporting tube, the valve being moved slightly upward from its normal position.

The head or casing 10 has a substantially cylindrical part 11, the lower portion of which is threaded, as at 12, and this threaded portion is engaged by the threaded part of a coupling nut 13. This coupling nut 13 has an inwardly extending flange 14 which is adapted to engage under a shoulder or flange portion 15 of a nozzle 16. The nozzle 16 may comprise two members 17 and 18, the latter forming the nozzle tip and having a threaded stem portion 19 which engages a threaded opening in the member 17 to hold the two parts properly together. The method of holding the nozzle to the casing may be of any suitable construction.

A valve or device 20 is held to slide freely upon a tubular member or pipe 21, and said valve is located within a recess or chamber 22 formed in the upper portion of the nozzle 16. The tubular member 21 is supported by a part of the stem portion 24 of a cylindrical member 25 which is arranged within the chamber 26 of the head 10, and said member 25 has its lower part extending slightly beyond the casing 10 so as to rest or be supported in the upper portion of the nozzle 16. The member 25 may have two parts 24 and 28, the larger part 28 fitting neatly within the head 10 and the smaller part 24 having its upper end abutting against a shoulder formed by the upper part of the chamber 26 against which the said part 24 of the member 25 may be seated and have a ground joint therewith, if desired. The member 25 has a tapering portion which joints the portions 24 and 28 through which are a series of openings 29 which communicate with the chamber 26 and with an interior chamber 30 formed by recessing the part 28 of the member 25. The chamber 26 within the head 10 communicates with a channel 30ª and this channel is connected to a source of acetylene gas supply through a pipe 31 so that the acetylene gas may pass through said pipe into the chamber 26 through openings 29 into the inner chamber 30 and about the valve 20.

The valve or device 20 has a valve portion 32 which is adapted when the said valve device is forced upward as will be presently described, to engage a seat 33 formed at the lower end of the part 28 of the member 25 and thereby serve to shut off the supply of acetylene gas or to permit the gas to flow when in the position shown in the drawings. This valve has a cylindrical body portion from which projects a plurality of lugs or wings 34 which are adapted to rest upon a shoulder 35 formed at the junction between the tapering part 36 of the chamber 22 and the straight portion 37 of said chamber. The valve is guided not only on its supporting tube 21 but also by the straight cylindrical portion 37 of the chamber formed in the nozzle and is confined in its movement along its support by the valve seat 33 and said shoulder 35. The lower part of the valve device 20 is tapered to correspond to the tapering portion of the chamber 22 and the lower part of the valve supporting tube 21 is also correspondingly tapered at 37ª and forms substantially a continuation of the tapered part of the valve when in the position shown in Fig. 1. The tube or member 21 is supported in the part 24 of the cylindrical member 25 and has its open end communicating with a channel 38, the latter communicating with a pipe 38ª leading to a source of oxygen supply. As is usual in devices of this kind the pressure of the oxygen supply is somewhat greater than the pressure of the fuel supply or acetylene gas and the extent of these pressures or their difference in pressures may be varied according to the requirements of the tool.

It will be seen that the oxygen gas may pass through the tubular supporting member 21 of the valve and that the oxygen in passing through will unite with the acetylene gas in its passage around the valve within the chamber 22, and owing to the tapering portion 36 of the chamber 22 and of the valve as well as the end of the supporting tube 21, the acetylene gas will be made to pass in the form of a sheet and unite with the oxygen gas as it passes from said tube 21, thus causing the two to thoroughly commingle. The mixed gas will pass through a channel 39 centrally located in the nozzle 16 to be ignited after passing from the channel in the usual way. In case a back flash takes place wherein a pressure is created which is greater than the pressure of the acetylene gas, such pressure will cause the valve 20 to move along its support 21 and to cause the valve portion 32 to engage the valve seat 33 and shut off the supply of acetylene gas and thereby prevent the ignition of the gases within the torch as would otherwise occur unless provision of some kind is provided. A spring 39ª is arranged around the tube 21 and within the valve 20, and said spring tends normally to force the valve to its seat and thereby assist the pressure due to a back flash to shut off the supply of acetylene gas, the spring being light enough to permit the valve to be unseated during the normal flow of the acetylene gas. The spring also serves to seat the valve when the acetylene gas is shut off and thereby prevents the oxygen gas from passing back into the source of acetylene gas supply in case the oxygen gas is turned on first. By this means all loss of gas and time incident to the resetting of the valves and the likelihood of having the torch injured by the heat flame is avoided.

To convert the tool to adapt the same for cutting purposes, I provide an additional connection for oxygen gas which supply of gas may be of greater pressure than the supply of the gases used for welding purposes. This supply of a gaseous body for cutting purposes may be variously controlled. As shown the head 10 is somewhat reduced in diameter as at 40, and at the upper end thereof is threaded at 41, and engaging the threaded portion is a packing nut or gland 42. A tubular stem 43 passes through the packing nut 42 around which may be a suitable packing, as at 44, and on the end of said stem is a thumb piece or finger part 45 by which the stem 43 may be rotated. The stem 43 has an enlarged part 46 which may be threaded so as to engage a threaded opening in the head 10 and by which the stem may be adjusted lengthwise of the head when the thumb piece 45 is rotated. The tubular stem is provided with a plurality of slots or openings 47 which are adapted to communicate with a chamber 48, and this chamber communicates with an oxygen supply pipe 49, so that oxygen from the pipe 49 may pass to the chamber 48 and through the slots 47 into and along the tubular stem 43. The tubular stem 43 has a reduced tubular part 50 which extends to the nozzle tip and joins the larger part of said stem at or about the tapering portion 37ª of the valve supporting tube 21. The stem 43 is provided with a tapered portion 51 forming a valve at the point where the part 50 of the stem joins the larger part. This valve 51 is adapted when the stem is adjusted to increase or diminish the space and opening in the end 37ª of the tube 21 to regulate the oxygen supply through the pipe 38ª. The stem 43 is centrally located within the nozzle 16 and head 10 and the stream of oxygen for cutting purposes is thereby directed centrally of the welding gases and the means for supplying the cutting gas may be adjusted to control the supply of oxygen of the welding gases by simply adjusting the stem 43.

It will be understood that the pipes 31, 38ª and 49 may be connected to or be supported by a handle or any other suitable means (not shown) to which connection may be made to the proper source of supply for the gases, that these pipes may be independently controlled by valves or other suitable means (not shown), and that any gas or combination of gases may be used where such gases may be employed in a device of this kind.

Having thus described my invention, I claim as new and desire to secure by Letters Patent:—

1. In a device of the character described, a nozzle having a passage in which gases are adapted to be mixed, means for supplying oxygen and acetylene gas to said passage, a valve located at the point of mixture of said gases adapted to automatically shut off the supply of acetylene gas in case of a back flash, and centrally disposed means for independently supplying oxygen for cutting purposes.

2. In a device of the character described, a nozzle having a passage in which gases are adapted to be mixed, means for supplying oxygen and acetylene gas to said passage, a valve freely movable within the device located at the point of mixture of said gases and adapted to automatically shut off the supply of acetylene gas, and adjustable means for independently supplying oxygen for cutting purposes.

3. In a device of the character described a nozzle having a mixing passage, means for supplying oxygen and acetylene gas thereto, a freely movable valve located at the point of mixture of said gases and adapted to automatically shut off the supply of acetylene gas, and means passing through the valve for independently supplying oxygen to the nozzle for cutting purposes.

4. In a device of the character described a nozzle having a mixing passage, means for supplying two different gases thereto, a valve located at the point of mixture of said gases and adapted to automatically shut off the supply of one of the gases, and centrally disposed means passing through the valve for independently supplying a gas to the nozzle for cutting purposes.

5. In a device of the character described a nozzle having a mixing passage, means for supplying oxygen and acetylene gas thereto, a valve located at the point of mixture of said gases and adapted to shut off the supply of acetylene gas, and centrally disposed and adjustable means for supplying a stream of oxygen to the nozzle for cutting purposes and for regulating the supply of acetylene gas.

6. In a device of the character described, a head, a nozzle communicating therewith, a substantially cylindrical member located within the head and provided with a valve seat, a tubular member supported by said cylindrical member, a valve having a part thereof tapered and having a valve portion adapted to engage the seat of the cylindrical member, means for supplying oxygen gas to the tubular member and acetylene gas within the cylindrical member about said tubular member, and an adjustable centrally disposed stem adapted to convey a cutting stream of oxygen under greater pressure to the nozzle tip.

7. In a device of the character described, a head, a nozzle communicating therewith, a substantially cylindrical member located within the head and provided with a valve seat, a tubular member supported in said member, a valve device having a part thereof tapered and having a valve portion adapted to engage the seat on the cylindrical member, means for supplying oxygen gas to the tubular member and acetylene gas within the first-mentioned member about said tubular member, and an adjustable centrally disposed stem adapted to convey a cutting stream of oxygen under greater pressure to the nozzle tip.

8. In a device of the character described, a head, a nozzle communicating therewith, a substantially cylindrical member located within the head and provided with a valve seat, a tubular member supported in said cylindrical member, a valve freely slidable on said tubular member and having a part thereof tapered and a valve portion adapted to engage the seat on the first-mentioned member, means for supplying oxygen gas to the tubular member and acetylene gas within the cylindrical member about said tubular member, and a centrally disposed stem adapted to convey a cutting stream of oxygen under greater pressure to the nozzle tip.

9. In a device of the character described, a head, a nozzle communicating therewith and having a chamber with a tapered portion at the upper part thereof and a channel therethrough, a cylindrical member having an inner chamber and provided with a valve seat, means for supplying acetylene gas to the chamber within the cylindrical member, a supporting tube having a tapered lower end, means for supplying oxygen gas to said supporting tube, a valve having a cylindrical body and a valve portion adapted to engage the valve seat and having a tapered body to assist in mixing the acetylene and oxygen gases, said valve being free to move a limited distance along the tubular support, and a centrally disposed and adjustable tubular stem having means to control the supply of the oxygen gas for welding purposes and adapted to convey oxygen therethrough to the nozzle tip for cutting purposes.

10. In a device of the character described, a head, a nozzle communicating therewith and having a chamber with a tapered portion at the upper part thereof and a channel therethrough, a member having an inner chamber, means for supplying acetylene gas to the chamber within said member, a tube having a tapered lower end, means for supplying oxygen gas to said tube, and a centrally disposed and adjustable tubular stem having means to control the supply of the oxygen gas for welding purposes and adapted to convey oxygen to the nozzle.

11. In a device of the character described, a head having a threaded opening, a nozzle communicating with the head, means for supplying oxygen and acetylene gas for welding purposes, an independent source of oxygen supply, a tubular stem having two parts of relatively different sizes centrally disposed within the head and the nozzle, said stem having means communicating with the source of oxygen supply for supplying oxygen gas to said stem and having a threaded portion intermediate its ends engaging the threaded opening in the head by which the said stem may be adjusted, a finger portion for adjusting the said stem, and a valve part on the stem for regulating the supply of oxygen used for welding purposes.

12. In a device of the character described, a head, a nozzle communicating therewith, means for supplying oxygen and acetylene gas for welding purposes, an independent source of oxygen supply for cutting purposes, a tubular stem having two parts of relatively different sizes centrally disposed within the head and the nozzle, said stem having means communicating with the source of independent oxygen supply, means for adjusting the said stem, and a valve part on the stem for regulating the supply of oxygen used for welding purposes.

13. A device of the character described, comprising a nozzle member, a head, a source of gas supply, a valve interposed between the head and the nozzle member and adapted to shut off the source of gas supply, and a spring tending normally to force the valve to its seat.

This specification signed and witnessed this 3rd day of January, A. D. 1912.

HARRY BROUSSEAU.

Witnesses:
 FRANCES KINREICH,
 C. BARTELS.